(12) United States Patent  (10) Patent No.: US 7,131,452 B2
Potter et al.  (45) Date of Patent: Nov. 7, 2006

(54) INTERNAL FUEL VAPOR VALVE

(75) Inventors: James Fuller Potter, Livonia, MI (US); Kale Stephen Schulte, Marshfield, WI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 108 days.

(21) Appl. No.: 10/932,430

(22) Filed: Sep. 2, 2004

(65) Prior Publication Data

US 2005/0023283 A1 Feb. 3, 2005

Related U.S. Application Data

(62) Division of application No. 10/133,086, filed on Apr. 26, 2002, now Pat. No. 6,810,913.

(51) Int. Cl.
F16K 24/04 (2006.01)
(52) U.S. Cl. .................... 137/15.17; 137/587
(58) Field of Classification Search ............. 137/15.17, 137/202, 587; 123/516; 220/749
See application file for complete search history.

(56) References Cited

U.S. PATENT DOCUMENTS

| | | | |
|---|---|---|---|
| 4,714,171 A | 12/1987 | Sasaki et al. | |
| 4,989,629 A | 2/1991 | Shirakawa | |
| 5,139,043 A | 8/1992 | Hyde et al. | |
| 5,277,217 A | 1/1994 | Kobayashi et al. | |
| 5,404,907 A | 4/1995 | Benjey et al. | |
| 5,992,441 A | 11/1999 | Enge et al. | |
| 6,035,883 A | 3/2000 | Benjey | |
| 6,062,250 A | 5/2000 | Takahashi | |
| 6,286,539 B1 | 9/2001 | Nishi et al. | |
| 6,289,915 B1 | 9/2001 | Nulman et al. | |
| 6,422,261 B1 | 7/2002 | DeCapua et al. | |
| 6,742,536 B1 * | 6/2004 | Mills ..................... | 137/15.17 |
| 2002/0100759 A1 | 8/2002 | Schmidt et al. | |

FOREIGN PATENT DOCUMENTS

GB  2 236 288 A  3/1991

* cited by examiner

*Primary Examiner*—John Fox
(74) *Attorney, Agent, or Firm*—Brinks Hofer Gilson & Lione

(57) ABSTRACT

A device that is adapted to be mounted to an interior surface of a polymeric fuel tank includes a body, a weld foot adapted to be inserted into the molten inner surface of the fuel tank and having a support surface adapted to control insertion of the weld foot into the molten inner surface of the fuel tank and to position the device relative to the inner surface, and a break zone positioned between and interconnecting the weld foot and the body and having a structural cross section that is weaker than the weld foot and the body such that under sufficient force, the break zone will fracture and allow the body to separate from the inner surface of the fuel tank, thereby leaving the weld foot embedded within the inner surface of the fuel tank.

4 Claims, 6 Drawing Sheets

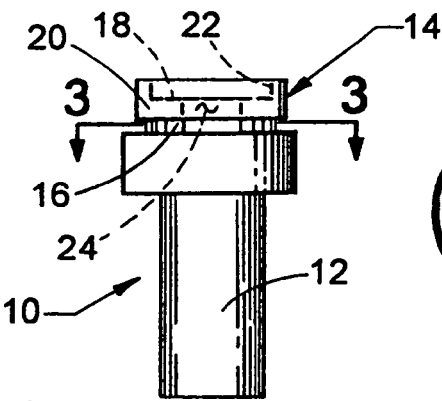
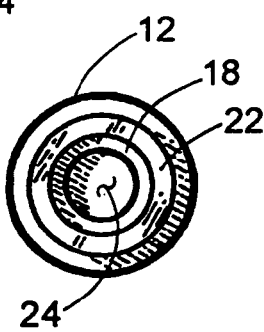
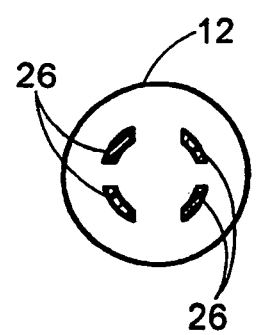
Fig. 1  Fig. 2  Fig. 3
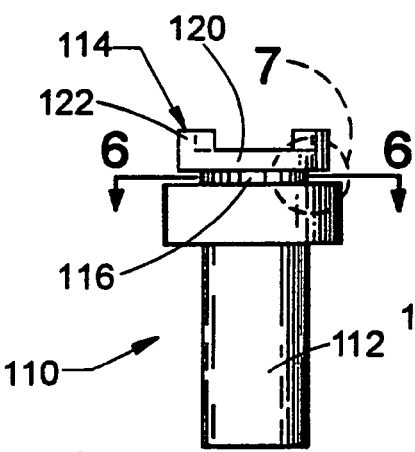
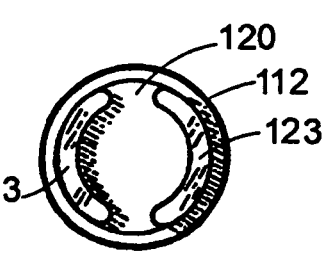
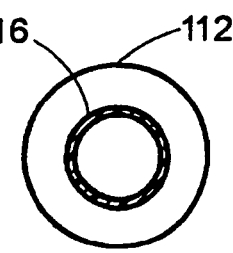
Fig. 4  Fig. 5  Fig. 6
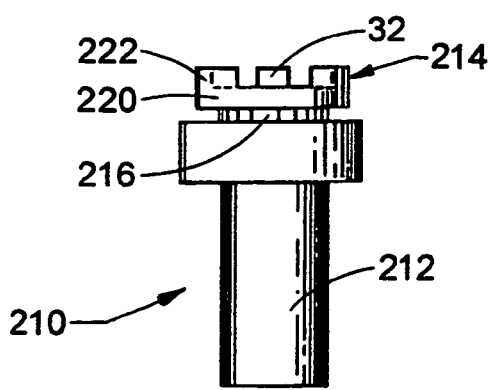
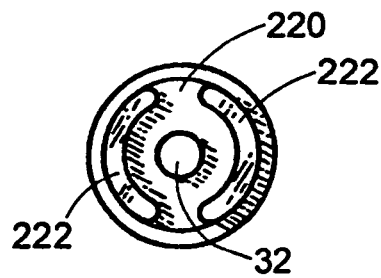
Fig. 9  Fig. 10

INTERNAL FUEL VAPOR VALVE

RELATED APPLICATION

This application is a divisional of application Ser. No. 10/133,086 filed Apr. 26, 2002, now U.S. Pat. No. 6,810,913.

TECHNICAL FIELD

The present invention generally relates to devices that are adapted to be mounted to the interior surface of a polymer fuel tank. Specifically, the present invention relates to features of such devices that allow the device to be securely mounted to the interior surface of a polymer fuel tank without compromising the structural integrity of the fuel tank.

BACKGROUND

Traditionally, the fuel tank within an automobile vehicle was made from metal, however, polymer fuel tanks are becoming more common, wherein the fuel tank is made from a polymeric material. Fuel tanks typically include devices such as vapor valves, modules, and baffles which perform specific functions within the fuel tank. Current methods of manufacturing polymer fuel systems include forming an opening in the polymeric fuel tank, inserting the device within the opening, and hot-plate welding the device into place. This compromises the structural integrity of the fuel tank. Therefore, there is a need for a vapor valve that is adapted to be mounted to the internal surface of a polymeric fuel tank and will not compromise the structural integrity of the fuel tank.

BRIEF DESCRIPTION OF THE DRAWINGS

FIG. 1 is a side view of a first preferred embodiment;
FIG. 2 is a top view of the first preferred embodiment;
FIG. 3 is a sectional view taken along line 3—3 of FIG. 1;
FIG. 4 is a side view of a second preferred embodiment;
FIG. 5 is a top view of the second preferred embodiment;
FIG. 6 is a sectional view taken along line 6—6 of FIG. 4;
FIGS. 9 is a side view of a third preferred embodiment;
FIG. 10 is a top view of the third preferred embodiment.

DETAILED DESCRIPTION OF THE PREFERRED EMBODIMENTS

Figure 7:
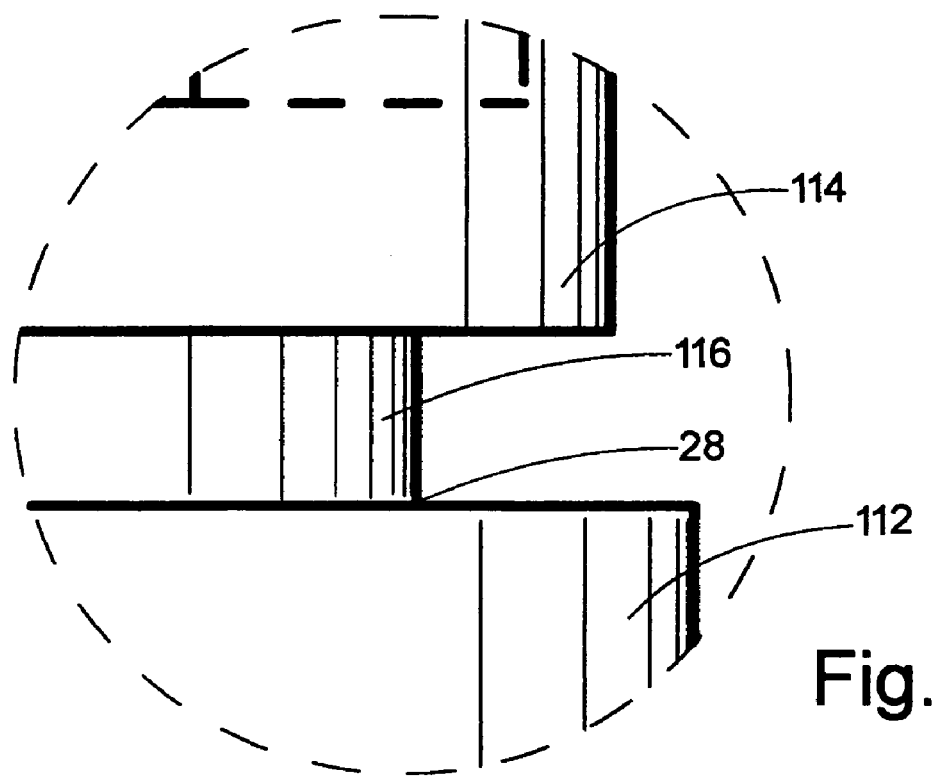
FIG. 7 is an enlarged view of a portion of FIG. 4.

The following description of the preferred embodiments of the invention is not intended to limit the scope of the invention to these preferred embodiments, but rather to enable any person skilled in the art to make and use the invention.

A known method of attaching a device to an interior surface of a polymer fuel tank includes heating the inner surface up to a temperature sufficient to transform the inner surface to a molten state, and inserting the device to be mounted into the molten inner surface. Once the inner surface cools and solidifies, the device is held securely therein.

Referring to FIG. 1, a device adapted to be mounted to an interior surface of a polymeric fuel tank is shown at 10. The device 10 includes a body 12, a weld foot 14, and a break zone 16 extending between and interconnecting the body 12 and the weld foot 14.

The weld foot 14 is adapted to be inserted into the molten inner surface of the fuel tank and includes a support surface 18 which is adapted to control the depth of insertion of the weld foot 14 into the molten inner surface of the fuel tank. Additionally, the support surface 18 provides stability to maintain the device 10 in the proper orientation relative to the inner surface of the fuel tank.

Preferably, the weld foot 14 includes a base 20 having an axially facing surface defining the support surface 18. The weld foot 14 further includes a protrusion 22 extending from the support surface 18. The protrusion 22 is adapted to be inserted into the molten inner surface of the fuel tank and the support surface 18 is adapted to contact the molten inner surface of the fuel tank to prevent further insertion of the protrusion 22. The protrusion 22 is adapted to melt upon insertion into the molten inner surface of the fuel tank such that, upon cooling, the protrusion 22 of the weld foot 14 and the inner surface of the fuel tank are molecularly bonded together.

The over-all size of the protrusion 22 is such that upon insertion of the protrusion 22 into the molten inner surface of the fuel tank, the latent heat from the molten inner surface will melt the protrusion 22. The shape and thickness of the protrusion 22 are such that the protrusion 22 will almost completely melt upon insertion and the material of the protrusion 22 will mix with the material of the molten inner surface so that when cooled, the protrusion 22 and the inner surface are molecularly bonded together, thereby bonding the weld foot 14 to the inner surface of the fuel tank.

The break zone 16 is positioned between and interconnects the weld foot 14 and the body 12. The break zone 16 has a structural cross section that is weaker than both the weld foot 14 and the body 12 such that under sufficient force, the break zone 16 will fracture and allow the body 12 to separate from the inner surface of the fuel tank, thereby leaving the weld foot 14 embedded therein. In this way, if the device 10 experiences any forces within the fuel tank that would be sufficient to possibly tear the device 10 from the inner surface of the fuel tank, the break zone 16 will provide a harmless location where the body 12 of the device 10 can separate from the inner surface. This is important, because the break zone 16 leaves the weld foot 14 imbedded in the inner surface, thereby reducing the risk of tearing a hole in the fuel tank.

When the weld foot 14 is inserted into the molten inner surface of the fuel tank, air must be able to escape from between the inner surface and the weld foot 14. Air trapped between the device 10 and the inner surface of the fuel tank would potentially compromise the effectiveness of the bonding between the weld foot 14 and the inner surface of the fuel tank. Therefore, the weld foot 14 is adapted to allow air to escape from between the device 10 and the inner surface of the fuel tank as the protrusion 22 is inserted into the molten inner surface of the fuel tank.

Referring to FIGS. 1—3, in a first preferred embodiment, the base 20 is circular and includes a passageway 24 to vent air from between the device 10 and the inner surface as the protrusion 22 is inserted within the molten inner surface of the fuel tank. The protrusion 22 is continuous and extends from an outer periphery of the circular support surface 18. In the first preferred embodiment, the break zone 16 comprises a plurality of legs 26 extending between the base 20 and the body 12. The combined cross-sectional area of the plurality of legs 26 is less than any other parallel cross section of the device 10.

Referring to FIGS. 4–6, a second preferred embodiment is shown at 110. The device 110 of the second preferred embodiment includes a body 112, weld foot 114, and break zone 116 similar to the device 10 of the first preferred embodiment. In the second preferred embodiment, the protrusion 122 comprises a plurality of extending portions 123 wherein air is vented between the plurality of extending portions 123 from between the device 110 and the inner surface of the fuel tank as the extending portions 123 are inserted into the inner surface of the fuel tank. A base 120 of the weld foot 114 is solid. As shown, the device 110 includes two extending portions 123, however, the second preferred embodiment could include any appropriate number of extending portions 123. In the second preferred embodiment, the break zone 116 comprises a single protrusion extending between the base 120 and the body 112. A single piece break zone 116 is possible because in the second preferred embodiment, air is vented from between the plurality of extending portions 123 which make up the weld foot protrusion 122.

As shown in FIG. 6, the break zone 116 is a circular thin walled section, however the break zone 116 could be any shape wherein the cross sectional area is less than any other parallel cross sectional area of the device 110, to insure that fracturing will occur within the break zone 116 prior to any other location on the device 110.

Figure 8:
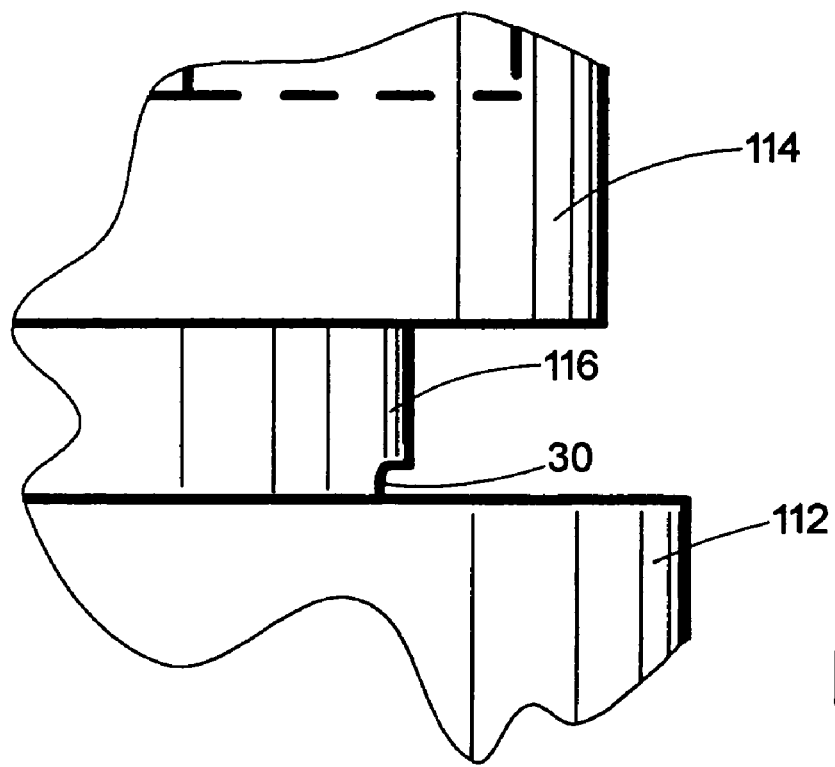
FIG. 8 is a view similar to FIG. 7 wherein the break zone includes a notch formed therein.

In either the first or second preferred embodiments, it is preferable that the break zone 16, 116 attach to either the weld foot 14, 114 or the body 12, 112 of the device 10, 110 with a sharp corner. Referring to FIG. 7, an enlarged view of a portion of FIG. 4 shows the region where the break zone 116 meets the weld foot 114. A fillet 28 where the two components meet has a small radius thereby providing a stress concentration point at which a crack will begin to propagate under sufficient force. Alternatively, a notch 30 can be formed at the point where the break zone 116 meets one of either the weld foot 114 or the body 112 of the device 110, as shown in FIG. 8. The notch 30 will provide a more effective stress concentration point, thereby insuring that the body 112 of the device 110 will break away from the weld foot 114 at the break zone 116.

Referring to FIGS. 9–12, a device 210 of a third preferred embodiment includes a body 212, a weld foot 214, and a break zone 216 similar to the first and second preferred embodiments. The device 210 of the third preferred embodiment further includes a support foot 32 extending from a base 220 of the weld foot 214 which is adapted to be inserted within the molten inner surface of the fuel tank simultaneously with a protrusion 222 of the weld foot 214. The support foot 32 could also extend from the structure of the body 212, wherein the break zone 216 includes an attachment of the support foot 32 to the body 212 which is adapted to fracture along with the other portions of the break zone 16. Preferably, the over-all size of the support foot 32 is larger than the over-all size of the protrusion 222, such that upon insertion within the molten inner surface of the fuel tank, the support foot 32 is adapted to remain substantially solid.

When the protrusions 22, 123, 222 of the weld foot 14, 114, 214 are inserted into the molten inner surface, the protrusions 22, 123, 222 immediately begin to melt, and as the protrusions 22, 123, 222 are inserted, they tend to flatten and spread out. This does not affect the molecular bonding, and in fact, provides good bonding against tensile forces that would tend to pull the device 10, 110, 210 away from the inner surface. However, because the protrusions 22, 123, 222 of the weld foot 14, 114, 214 melt quickly, they do not penetrate fully into the molten inner surface, and therefore do not provide optimal resistance to shear forces that the device 10, 110, 210 may experience.

When the larger support foot 32 is inserted within the molten inner surface, melting begins to take place immediately. However because the support foot 32 is larger, a substantial portion of the support foot 32 remains solid until the device 210 is fully inserted, thereby providing deeper penetration into the inner surface than the protrusions 222 of the weld foot 214. The support foot 32 does not ever fully melt, so, the bonding of the support foot 32 to the inner surface of the fuel tank is not at strong as the bond of the protrusions 222 of the weld foot 214. This means that the strength of the bond of the support foot 32 under tensile forces is weaker. However, due to the depth of penetration into the inner surface, the support foot 32 provides much better resistance to shear forces than the protrusions 222.

Preferably, the support foot 32 is made from the same material, such as High Density Polyethylene, as the protrusions 222 of the weld foot 214, however, the support foot 32 could also be made from an alternative material, such as Acetyl, which is completely resistant to melting. A support foot 32 made from a material which does not melt under these attaching conditions would remain completely solid, thereby providing optimal penetration into the inner surface. However, a support foot 32 made from such a material would provide little or no resistance to tensile forces.

Figure 11:
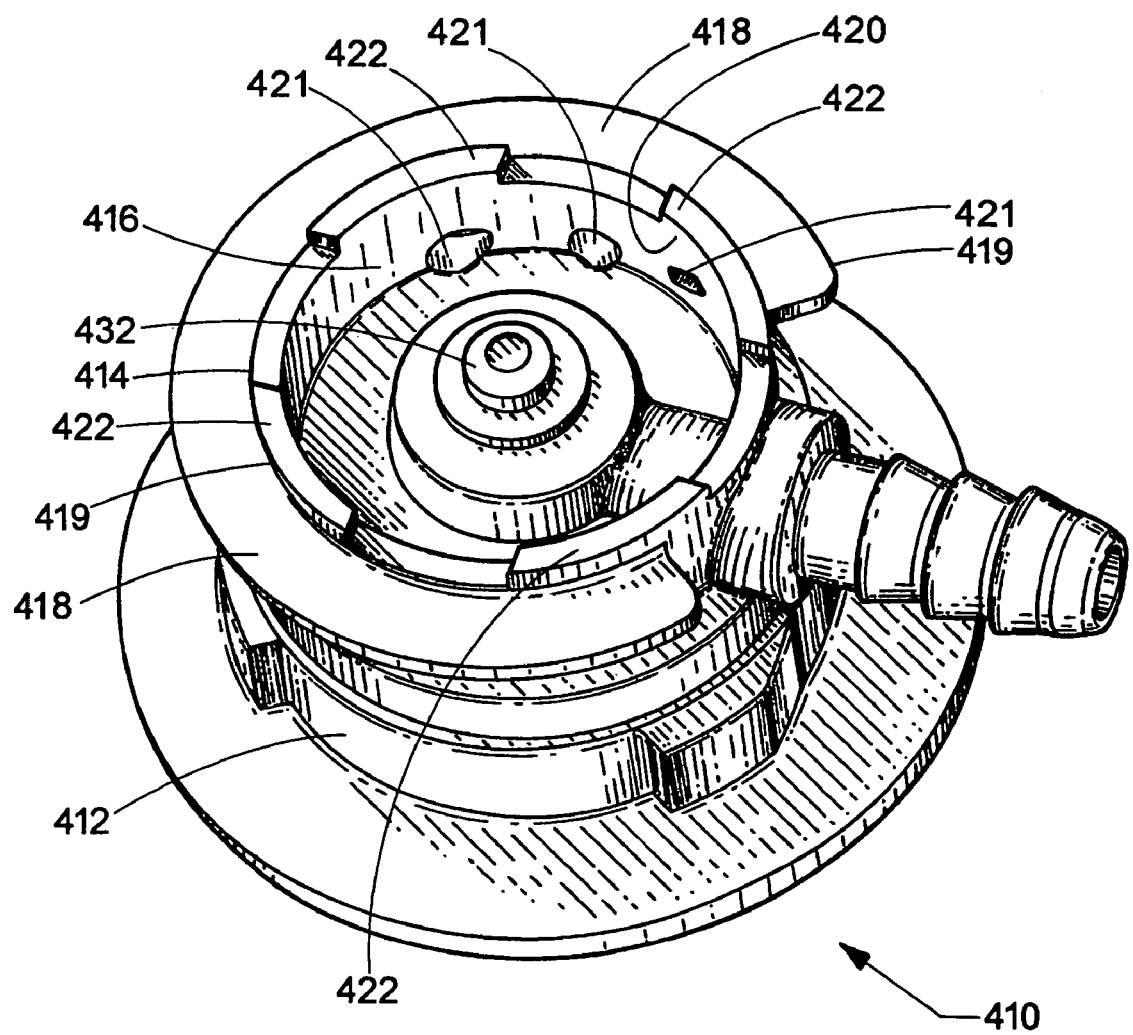
FIG. 11 is a perspective view of a fuel vapor valve incorporating the principles of the present invention.
Figure 12:
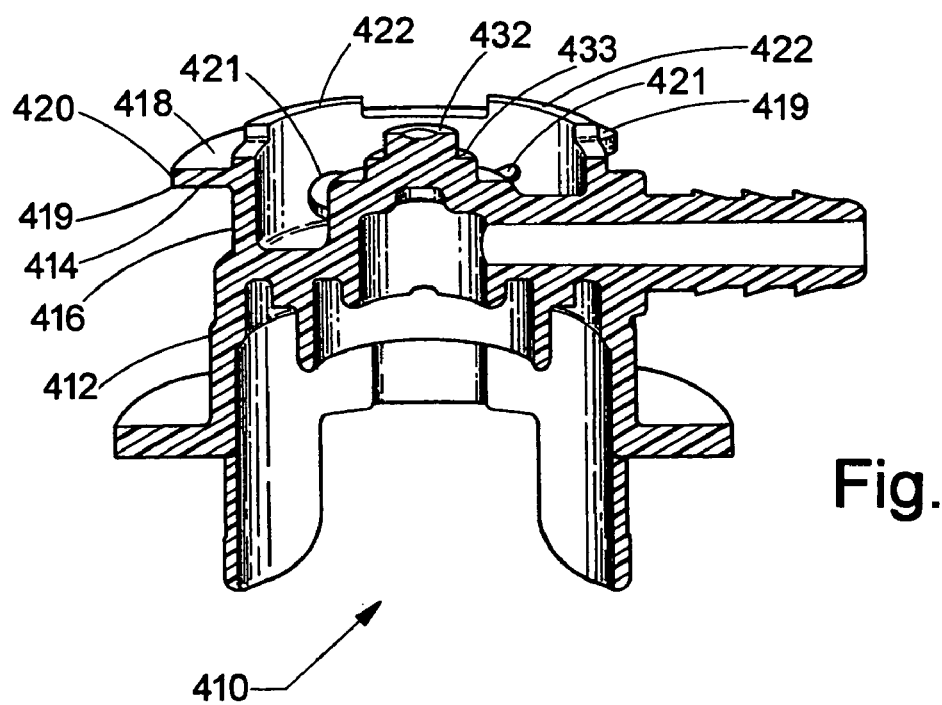
FIGS. 12–14 are side sectional views of the fuel vapor valve of FIG. 11.
Figure 13:
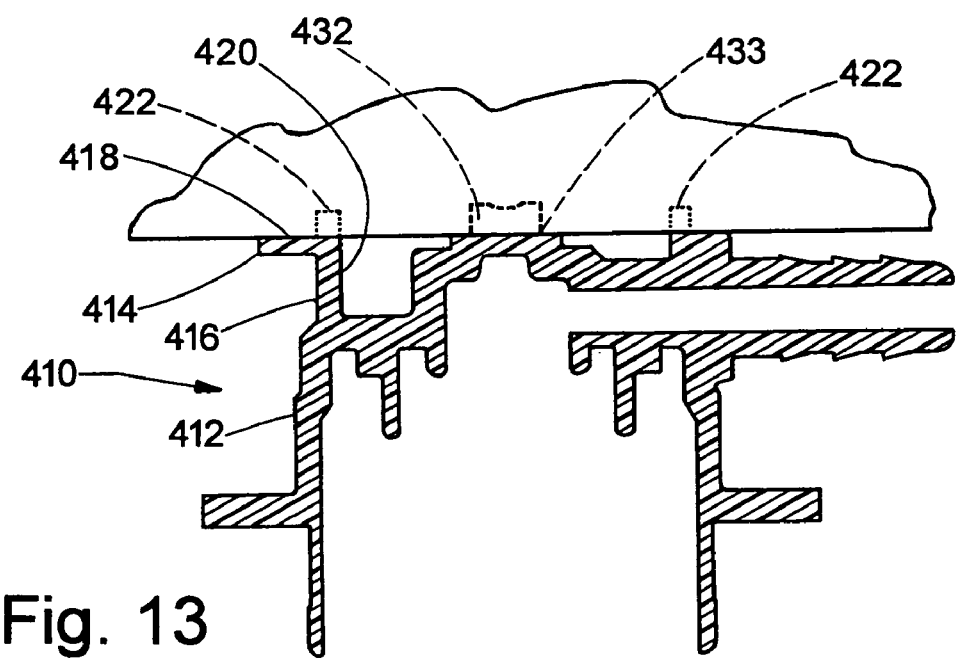

An example of one such device which is adapted to be mounted to the inner surface of a polymer fuel tank is a fuel vapor valve. Referring to FIGS. 11,12 and 13, a housing of a fuel vapor valve having features of the present invention is shown generally at 410. The housing 410 includes a body 112, having a weld foot 414 and a break zone 416 positioned between and interconnecting the body 412 and the weld foot 414.

The weld foot 414 includes a base 420 having an axially facing support surface 418. As shown, the base 420 comprises a cylindrical section extending upward from a top portion of the housing 410, and the support surface 418 of the fuel vapor valve housing 410 is defined by an annular flange 419 extending radially from the base 420, adjacent a distal end of the base 420.

The weld foot 414 further includes four protrusions 422 extending from the support surface 418, however, it is to be understood, that the invention could be practiced with any number of protrusions, depending upon the particular application. The protrusions 422 are adapted to be inserted into the molten inner surface of the fuel tank and the support surface 418 is adapted to contact the molten inner surface of the fuel tank to prevent further insertion of the protrusions 422. The protrusions 422 are adapted to melt upon insertion into the molten inner surface of the fuel tank such that, upon cooling, the protrusions 422 of the weld foot 414 and the inner surface of the fuel tank are molecularly bonded together.

The housing 410 further includes a support foot 432 extending therefrom which is adapted to be inserted within the molten inner surface of the fuel tank simultaneously with the protrusions 422 of the weld foot 414. The diameter of the support foot 432 is larger than the thickness of the protrusions 422, such that upon insertion within the molten inner surface of the fuel tank, the support foot 432 is adapted to remain substantially solid.

Preferably, the support surface 418 and the support foot 432 are made from the same material, such as High Density Polyethylene, as the protrusions 422 of the weld foot 414, however, one or both of the support surface 418 and the support foot 432 could also be made from an alternative material, such as Acetyl, which is completely resistant to melting.

Figure 14:
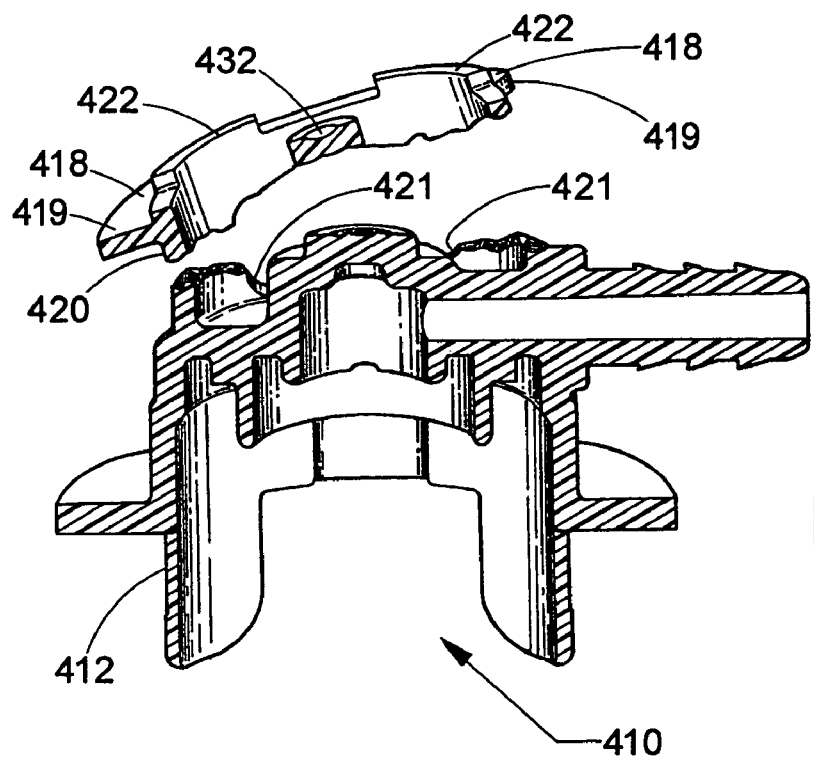

The break zone 416 is positioned between and interconnects the weld foot 414 and the body 412. As shown, the break zone 416 comprises a lower portion of the base 420 which includes holes 421 formed therein, thereby defining a portion of the base 420 which has a structural cross section that is weaker than both the remaining portions of the base 420 and the body 412. Additionally, the support foot 432 meets a structural portion of the housing at a point having a sharp radius, thereby defining a stress concentration point 433. Referring to FIG. 14, under sufficient force, the body 412 will break away from the weld foot 414 within the break zone 416, and the support foot will break away from the housing 410 at the stress concentration point 433, to allow the body 412 to separate from the inner surface of the fuel tank, thereby leaving the weld foot 414 embedded therein. The holes 421 formed within the break zone 416 further provide a passage to vent air from between the housing 410 and the inner surface of the fuel tank as the housing 410 is mounted.

Figure 15:
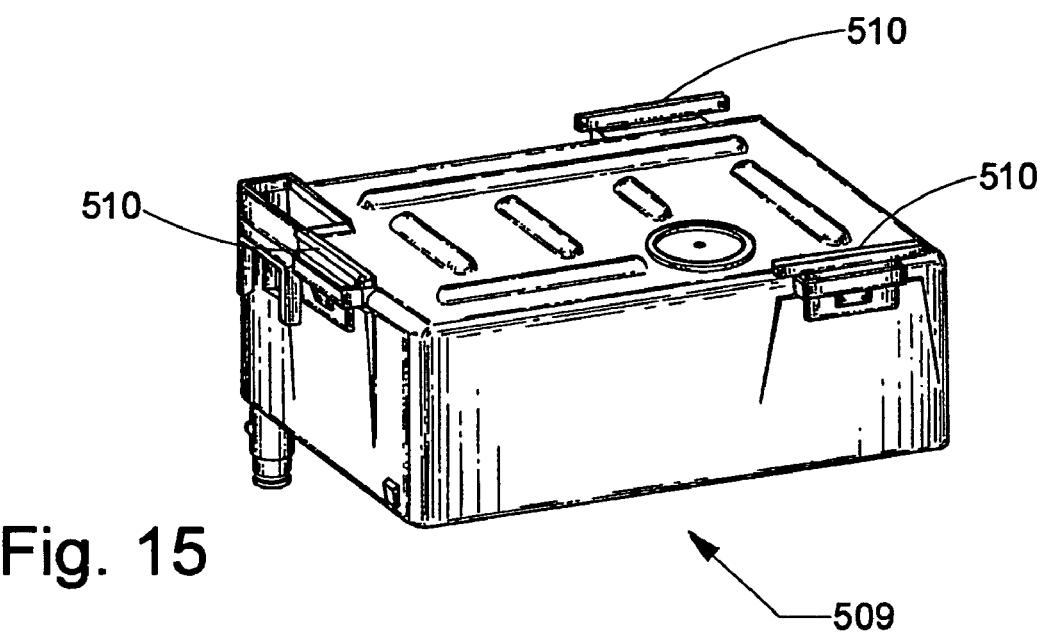
FIG. 15 is a perspective view of a module having clips incorporating the principles of the present invention.
Figure 16:
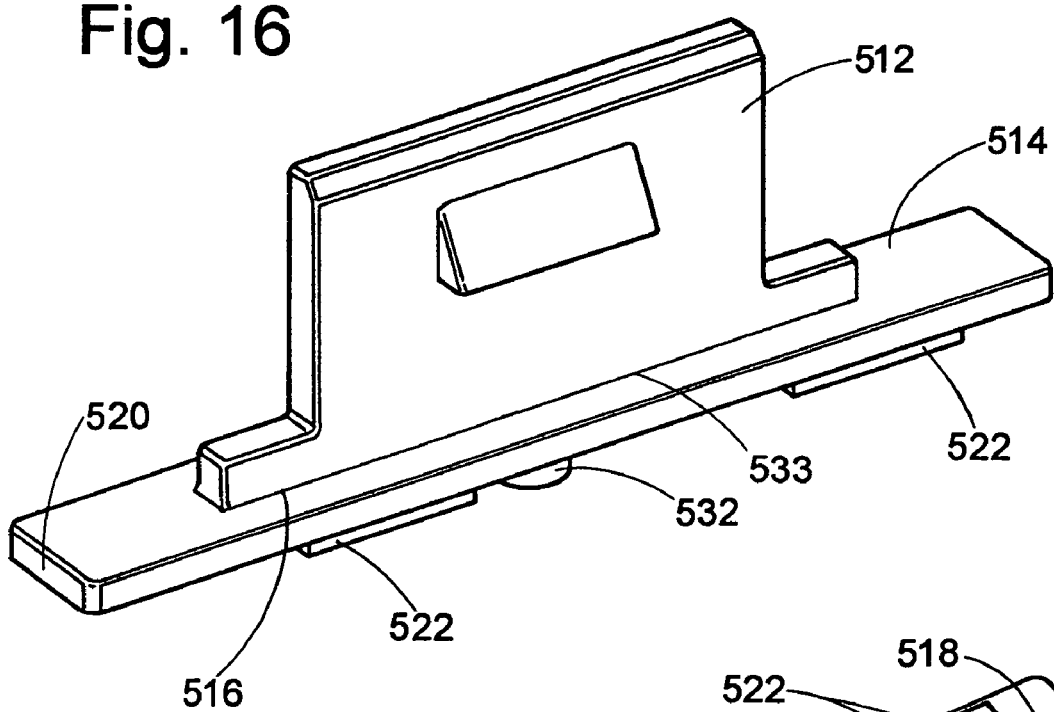
FIGS. 16 and 17 are perspective views of the clip shown in FIG. 15.
Figure 17:
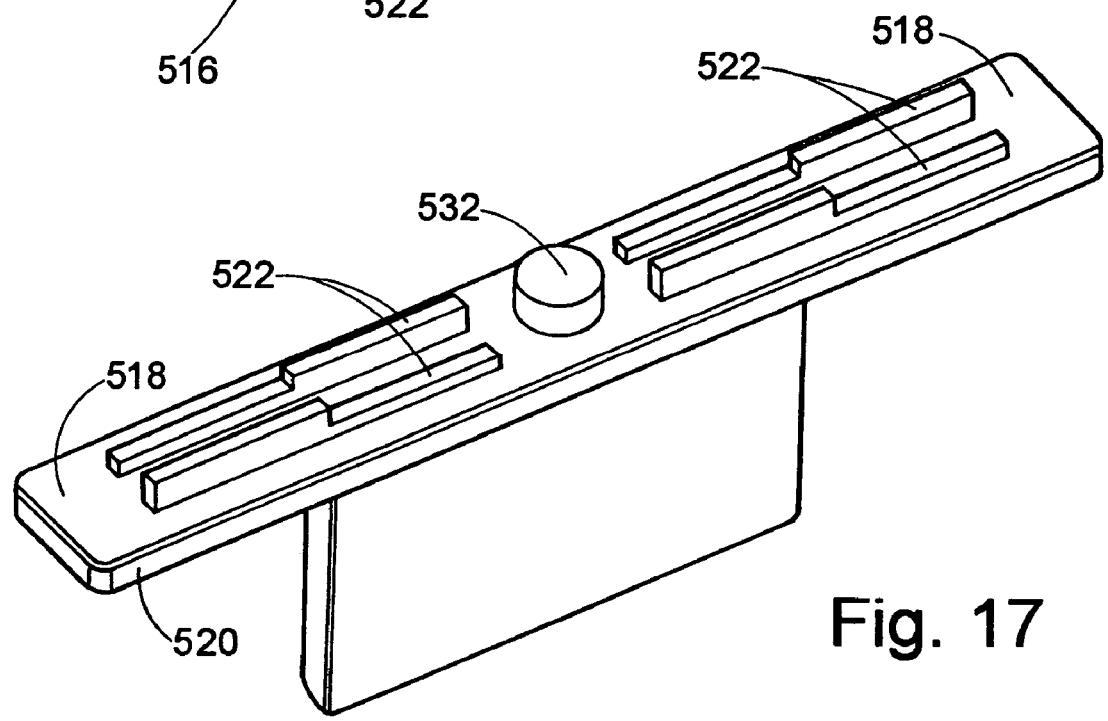

Another example of a device adapted to be mounted to the inner surface of a polymer fuel tank is a clip for mounting a module. Referring to FIG. 15, a module 509 is shown having three clips 510 which are adapted to mount to the inner surface of the fuel tank and to support the module 509 thereon. Referring to FIGS. 16 and 17, each clip 510 includes a body 512, having a weld foot 514 and a break zone 516 positioned between and interconnecting the body 512 and the weld foot 514.

The weld foot 514 includes a base 520 having an axially facing support surface 518. As shown, the base 520 comprises a rectangular shaped block having the body 512 extending from a side thereof. The weld foot 514 further includes four protrusions 522 extending from the support surface 518, however, it is to be understood, that the invention could be practiced with any number of protrusions 522, depending upon the particular application. The protrusions 522 extend axially from the support surface 518 and extend along the length of the base 520. The protrusions 522 of the clip 510 have a stepped profile such that different areas of the protrusions 522 have different heights and will penetrate into the molten inner surface of the fuel tank to different depths. The allows molecular bonding between the protrusions 522 and the inner surface of the fuel tank to take place at varying depths within the surface of the fuel tank.

The clip 510 further includes a support foot 532 extending from the support surface 518. The diameter of the support foot 532 is larger than the thickness of the protrusions 522, such that upon insertion within the molten inner surface of the fuel tank, the support foot 532 is adapted to remain substantially solid. Preferably, the support surface 518 and the support foot 532 are made from the same material as the protrusions 522 of the weld foot 514, however, one or both of the support surface 518 and the support foot 532 could also be made from an alternative material, such as Acetyl, that is completely resistant to melting.

The break zone 516 is positioned between and interconnects the weld foot 514 and the body 512. As shown, the break zone 516 comprises a sharp radius located at the point where the body 512 meets the weld foot 514. The sharp radius provides a stress concentration point 533 whereupon a crack will begin to propagate under sufficient force. Alternatively, there can be notch, similar to the notch shown in FIG. 8, formed at the point where the weld foot 514 meets the body 512. Under sufficient force, the body 512 will break away from the weld foot 514 at the break zone 516 to allow the body 512 to separate from the inner surface of the fuel tank, thereby leaving the weld foot 514 embedded therein.

The foregoing discussion discloses and describes the preferred embodiments. One skilled in the art will readily recognize from such discussion, and from the accompanying drawings and claims, that changes and modifications can be made to the preferred embodiments without departing from the true spirit and fair scope of the inventive concepts as defined in the following claims. The preferred embodiments have been described in an illustrative manner, and it is to be understood that the terminology which has been used is intended to be in the nature of words of description rather than of limitation.

What is claimed is:

1. A method of attaching a device to the inner surface of a polymer fuel tank comprising:

providing a device having a body and a weld foot adapted to be inserted into the inner surface of the fuel tank, the weld foot having a support surface adapted to control insertion of the weld foot into the inner surface of the fuel tank;

heating the inner surface of the fuel tank to a molten state;

inserting the weld foot into the molten inner surface of the fuel tank until the support surface contacts the inner surface of the fuel tank;

allowing the weld foot to melt such that the weld foot and the inner surface of the fuel tank, molecularly interact;

cooling the inner surface of the fuel tank and the weld foot to solid state, wherein the weld foot and the inner surface of the fuel tank are molecularly bonded together.

2. A method of attaching a device to the inner surface of a polymer fuel tank comprising:

providing a device having a body and a weld foot adapted to be inserted into the inner surface of the fuel tank, the weld foot having a support surface adapted to control insertion of the weld foot into the inner surface of the fuel tank, the weld foot including a base having an axially facing surface defining the support surface, and a protrusion extending from the axially facing surface, heating the inner surface of the fuel tank to a molten state, inserting the weld foot into the molten inner surface of the fuel tank until the support surface contacts the inner surface of the fuel tank, and wherein inserting the weld foot into the molten inner surface of the fuel tank until the support surface of the base contacts the inner surface of the fuel tank includes inserting the protrusion into the molten inner surface of the fuel tank;

allowing the weld foot to melt such that the weld foot and the inner surface of the fuel tank molecularly interact;

cooling the inner surface of the fuel tank and the weld foot to solid state, wherein the weld foot and the inner surface of the fuel tank are molecularly bonded together.

3. The method of claim 2 including venting air from between the axially facing surface and the inner surface of the fuel tank as the protrusion is inserted within the inner surface of the fuel tank.

4. The method of claim 3 wherein said body further includes a break zone positioned between and interconnecting the weld foot and the body, the break zone having a structural cross section that is weaker than the weld foot and the body such that under sufficient force, the break zone will fracture and allow the body to separate from the inner wall of the fuel tank, thereby leaving the weld foot imbedded within the inner wall of the fuel tank.

* * * * *